(12) United States Patent
Newman

(10) Patent No.: US 11,074,789 B2
(45) Date of Patent: Jul. 27, 2021

(54) TECHNIQUE TO DETER THEFT FROM AUTOMATED TELLER MACHINES

(71) Applicant: TEXAS INSTRUMENTS INCORPORATED, Dallas, TX (US)

(72) Inventor: Merril Ray Newman, Schaumburg, IL (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 67 days.

(21) Appl. No.: 16/537,067

(22) Filed: Aug. 9, 2019

(65) Prior Publication Data

US 2021/0043047 A1    Feb. 11, 2021

(51) Int. Cl.
*G07F 19/00*    (2006.01)
*G06F 3/041*    (2006.01)

(52) U.S. Cl.
CPC ............ *G07F 19/203* (2013.01); *G06F 3/041* (2013.01); *G07F 19/205* (2013.01)

(58) Field of Classification Search
CPC .............................. G07F 19/203; G07F 19/205
USPC .......................................................... 235/379
See application file for complete search history.

(56) References Cited

U.S. PATENT DOCUMENTS 5,905,653 A * 5/1999 Higham ................. G16H 20/13
   700/244
9,224,273 B1 * 12/2015 Atkinson .............. G07F 19/201

* cited by examiner

*Primary Examiner* — Toan C Ly
(74) *Attorney, Agent, or Firm* — Ebby Abraham; Charles A. Brill; Frank D. Cimino

(57) ABSTRACT

Techniques related to an electronic device, comprising one or more processors, a user interface, a bill dispensing mechanism in a dispensing area, the bill dispensing area having a first sensor, and a non-transitory program storage device comprising instructions stored thereon to cause the one or more processors to receive, from the user interface, a request to dispense a bill, receive, from the first sensor, a first signal indicating a first touch on the first sensor in the bill dispensing area, and dispense the bill based on the received first signal indicating the first touch.

22 Claims, 3 Drawing Sheets

TECHNIQUE TO DETER THEFT FROM AUTOMATED TELLER MACHINES

BACKGROUND

Automated teller machines (ATMs) are devices that provide banking services to a user. Typically, an ATM may be operated by the user first swiping or inserting a card into the ATM and entering a personal identification number. The card may include magnetic information and/or one or more electronic chips that may be used by the ATM to obtain account information. The ATM may then be used to provide one or more available services to the user. One service that ATMs commonly provide is dispensing cash (e.g., bills) to a user from an account of the user. Once the user selects that service and indicates an amount of cash to dispense, the ATM then dispenses the amount of cash to the user via a dispensing door or slot.

One existing method of cash theft from ATM users is to hide, block, or conceal the dispensing door or slot from the user using a cover over the dispensing door or slot connected to a container. When the user attempts to withdraw cash from the ATM, the cover blocks user access to the cash and places the cash into the container. The container is then later collected by thieves. What is needed is a technique to assure users and the ATM itself that the ATM cash dispenser is accessible to the user.

SUMMARY

This disclosure relates generally to devices including a cash dispensing mechanism. More particularly, but not by way of limitation, aspects of the present disclosure relate to an electronic device, comprising one or more processors, a user interface, a bill dispensing mechanism in a dispensing area, the bill dispensing area having a first sensor, and a non-transitory program storage device comprising instructions stored thereon to cause the one or more processors to receive, from the user interface, a request to dispense a bill, receive, from the first sensor, a first signal indicating a first touch on the first sensor in the bill dispensing area, and dispense the bill based on the received first signal indicating the first touch.

Another aspect of the present disclosure relates to a system, comprising one or more processors, a user interface, a bill dispensing mechanism in a dispensing area, the bill dispensing mechanism including a dispensing area having a first sensor, and a non-transitory program storage device comprising instructions stored thereon to cause the one or more processors to receive, from the user interface, a request to dispense a bill, receive, from the first sensor, a first signal indicating a first touch on the first sensor in the bill dispensing area, and dispense the bill based on the received first signal indicating the first touch.

Another aspect of the present disclosure relates to a method, the method including receiving, from a user interface, a request to dispense a bill, receiving, from a first sensor disposed on a dispensing area, a first signal indicating a first touch on the first sensor in the dispensing area, and dispensing the bill based on the received first signal indicating the first touch.

It may be understood that while techniques herein are discussed in the context of a dedicated ATM device, nothing in this disclosure is meant to limit these techniques to such devices. Rather, the techniques discussed herein are readily applicable across a broad range of devices machines, including, but not limited to an unattended machine configured to provide banking services, including dispensing cash, devices that are not specifically designed as an ATM, but are capable of dispensing cash, and other such devices.

BRIEF DESCRIPTION OF THE DRAWINGS

For a detailed description of various examples, reference will now be made to the accompanying drawings in which.

DETAILED DESCRIPTION

Figure 1:
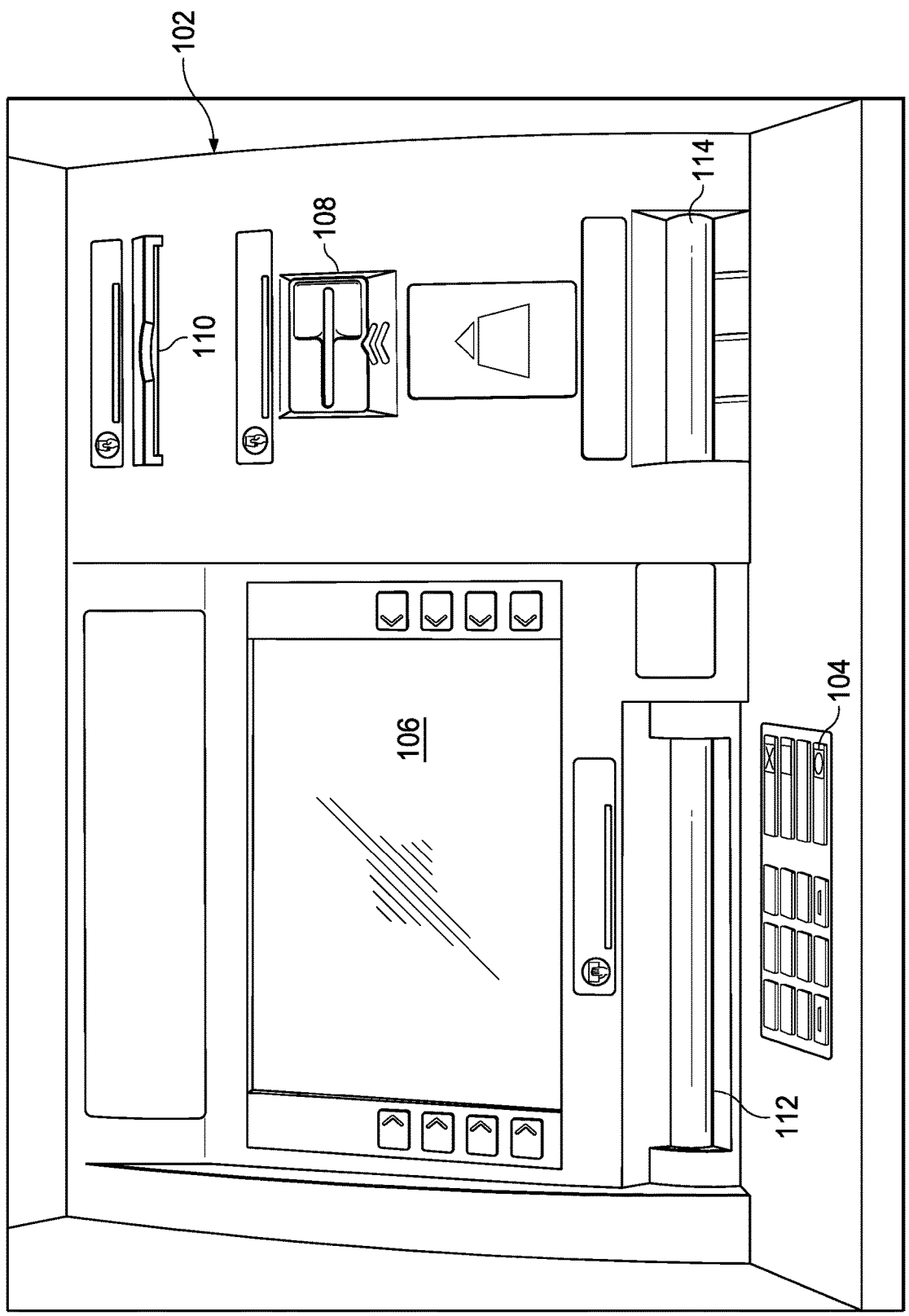
FIG. 1 illustrates an exemplary ATM, in accordance with aspects of the present disclosure.

FIG. 1 illustrates an exemplary ATM 100, in accordance with aspects of the present disclosure. The ATM includes a front fascia 102. Disposed on or through the front fascia 102 of the ATM 100 includes a keyboard 104, a display 106, a card slot 108, and receipt slot 110. The ATM further includes a cash dispenser door 112 and a deposit accepting door 114. In certain cases, the cash dispenser door 112 may open to expose a cash dispenser slot underneath the cash dispenser door 112. In other cases, the cash dispenser door 112 may be omitted and just the cash dispenser slot may be used. In other cases, the cash dispenser slot may include a non-moveable shield or guard. In certain cases, the ATM may also include other components and/or openings, such as cameras, additional user interface controls, such as buttons, headphone plugs, processor, memory, storage, hardware interfaces, etc.

In addition, in certain embodiments, ATM 100 may be any type of device that dispenses any tangible item to a user. For example, ATM 100 may also encompass an automatic dispensing machine like an automated drug cabinet, a vending machine, a ticket dispenser, fluid dispenser, or any type of dispensing device that dispenses an item to a user. Additionally, keyboard 104 may be any input device that can receive information (e.g., text, touch, gestures, facial recognition) from the user. Likewise, card slot 108 may be any type of input device that can identify either the user (e.g., a biometric scanner) or receive an item (e.g., insurance card, driver's license, passport, etc.) to identify a property associated with the user (e.g., a card scanner, radio-frequency transceiver, infrared scanner, etc.) Moreover, cash dispenser door 112 may include any type of door, covering, shield, and/or guard that prevents or impedes access to an item that is being dispensed.

Increasingly, cash is being stolen from ATM users through the use of a cover or other blocker which hides or otherwise blocks access to an ATM cash dispenser. Generally; when the ATM user attempts to withdraw cash from an ATM with a covered cash dispenser, the cash is taken from the cash dispenser and placed into a container that a thief can access at a later time. These covers and blockers can be difficult to detect by users as the thieves have become increasingly skilled at disguising the covers and blockers. Detecting these covers and blockers reliably can be difficult using existing sensors typically found on ATMs, and new detection techniques can be costly to develop and implement. While discussed in the context of an ATM, it may be understood that aspects of the present disclosure may be desirable for other devices capable of dispensing items to a user, such as an automated drug cabinet, a vending machine, an automated locker, fluid dispenser, or other item dispenser.

A user needs to be able to access the cash dispenser slot or door in order to be able to obtain cash from the case dispenser slot. One or more sensors may be placed in a cash dispensing area where the cash dispensing area includes the mechanism used to dispense the cash as well as the dispenser door or slot. In one example, the one or more sensors are located as close as practicable to the cash dispenser door or slot. For example, the one or more sensors may be within approximately two inches of a dispenser slot. In another example, the one or more sensors are located on the cash dispenser door or slot. The sensors help determine whether the user is able to access the cash dispenser. In certain cases, the sensor may attempt to characterize the environment directly around the cash dispenser. For example, a proximity sensor or optical light sensor may be placed on the door or slot. In other cases, the sensor may attempt to verify the user, such as using a fingerprint reader or iris scanner integrated into the cash dispenser door or slot.

Figure 2A:
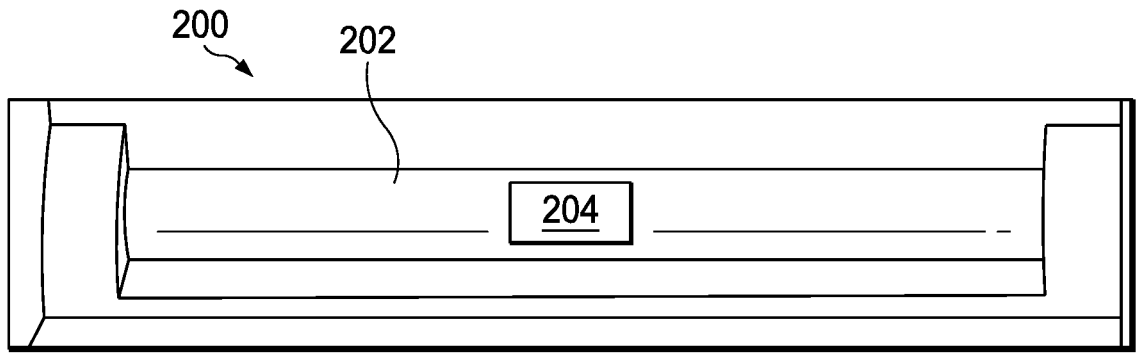
FIGS. 2A, 2B, and 3 are architecture diagrams illustrating portions of an ATM, in accordance with aspects of the present disclosure.
Figure 2B:
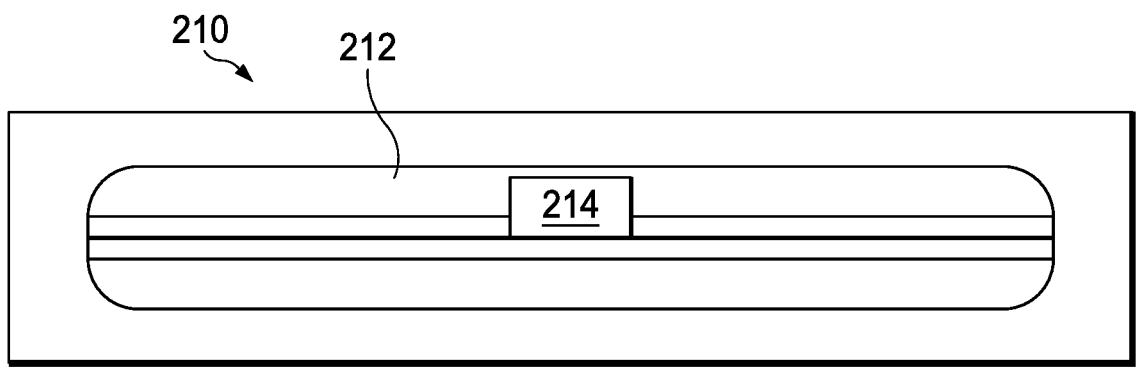

In certain cases, a touch sensor may be used. A touch sensor falls in between an environment type sensor and an identity based sensor generally in terms of complexity and user involvement. Generally, if a user is able to touch the cash dispenser slot or door, then the user has access to the cash dispenser slot or door. FIGS. 2A and 2B are architecture diagrams illustrating cash dispensing areas 200 and 210, in accordance with aspects of the present disclosure. The cash dispensing area 200 includes a cash dispenser door 202. Disposed upon the cash dispenser door 202 is touch sensitive area 204. In certain cases, touch sensitive area 204 is implemented using a capacitive touch sensor. In certain cases, such as where the cash dispenser door 202 is made of metal, the touch sensitive area 204 may be implemented using a through metal capacitive touch sensor. Other types of touch sensors may also be used, such as a resistive sensor, infrared sensor, or surface acoustic wave sensor. After a user request to obtain cash is obtained by the ATM, the ATM may indicate to the user to touch the touch sensitive area 204 on the cash dispenser door 202. For example, the ATM may display a user interface (UI) with an image or instructions on the display to the user instructing the user to touch the touch sensitive area 204. In cases where an alternate UI is utilized, such as for visually impaired users, audio prompts or other similar techniques consistent with the alternate UI may be utilized.

Having the user physically interact with the dispenser door 202 can assure the user that they can access cash dispensed by the ATM prior to actually dispensing the cash. Similarly, the touch sensitive area 204 on the cash dispenser door 202 allows the ATM to determine that the user has access to the cash dispensing area 200 and 210, including the cash dispenser door 202 and the cash dispenser slot beneath the cash dispenser door 202. The presence of a cover over the dispenser door 202 would impede the operation of the touch sensitive area 204 as the user cannot reach the touch sensitive area 204. If no touch is detected on the touch sensitive area 204, such as after a certain time period, the transaction may be cancelled. If the ATM detects a touch from the user, the ATM may then open the cash dispenser door 202 and dispense the requested cash via the cash dispenser slot.

In certain cases, it may be desirable to verify a particular person has access to the item dispenser. For example, an automated drug cabinet may include a sensor capable of verify an identity of a person attempting to access an item dispenser of the automated drug cabinet, such as by using a fingerprint reader, iris scanner, face scanner, or other biometric sensor positioned in an item dispensing area, such as on the item dispenser door or as close as practicable to the item dispenser door or slot. The item dispenser may then detect the presence of a user using the sensor, and after verifying that the user is an expected user, the item dispenser may open the item dispenser door and dispense the item.

In certain cases, the ATM may also partially move or vibrate the dispenser door 202. This movement may be in addition to or instead of the displayed UI or alternate UI. Movement of the dispenser door 202 may help draw user attention to the dispenser door 202. Movement of the dispenser door 202 responsive to the user's request to dispense cash may also indicate to the user that they can access the dispenser door 202, and that the dispenser door 202 is working as expected. In certain cases, the displayed UI or alternate UI may indicate to the user that the dispenser door 202 may partially move or vibrate. In certain cases, the dispenser door 202 may move to a position where the touch sensitive area 204 becomes accessible to the user. For example, the touch sensitive area 204 may be disposed on the dispenser door 202 in such a way that the touch sensitive area 204 is not visible or accessible by the user in the normal position of the dispenser door 202. When the user request to dispense cash is received by the ATM, the ATM may then move the dispenser door 202 to expose the touch sensitive area 204 to the user. In certain cases, exposing the touch sensitive area 204 may, or may not, make the cash dispensing slot directly accessible or visible to the user. For example, the dispenser door 202 may move into a partially open position that still blocks the cash dispenser slot. This movement may be performed along with the indications displayed in the UI or in the alternate UI.

FIG. 2B illustrates a case where the cash dispensing area 210 includes a cash dispenser slot 212 without a cash dispenser door 202. In such cases the touch sensitive area 214 may be positioned proximate to the cash dispenser slot 212 in such a way that covering the cash dispenser slot would cover the touch sensitive area 214. For example, the touch sensitive area 214 may be positioned immediately next to the cash dispenser slot. In certain cases, the cash dispensing area 210 may include a shield or guard over or around the cash dispenser door 212. As another example, the touch sensitive area 214 may be placed upon or under the shield or guard.

In certain cases, the ATM may, prior to indicating to the user to touch the touch sensitive area 204 and 214, verify that a touch is not already being detected in the touch sensitive area, for example, by a user, or a cover. If a touch is detected prior to instructing the user, the ATM may instruct the user to stop touching the touch sensitive area 204 and 214. If the touch sensitive area 204 and 214 continue to register a touch, such as if a cover is present, then the ATM may cancel the transaction after a period of time. In certain cases, the ATM may also provide a UI element or interface where the user can indicate that they are not touching the touch sensitive area 204 and 214. In certain cases, if the touch sensitive area 204 is not in a user accessible location and a touch is detected, the ATM may cancel the transaction. If no touch is detected prior to instructing the user, then the ATM may proceed to instruct the user to touch the touch sensitive area 204 and 214.

Figure 3:
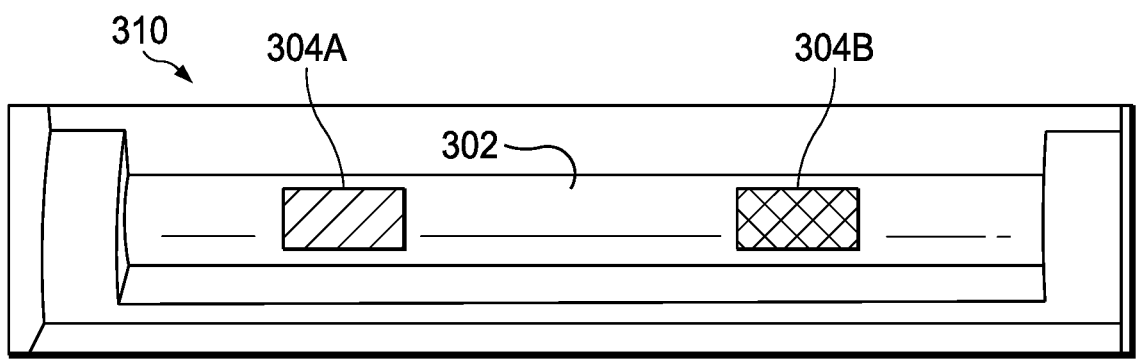

FIG. 3 an architecture diagram illustrating a portion of an ATM 300, in accordance with aspects of the present disclosure. ATM 300 includes a cash dispenser door 302 and disposed on the cash dispenser door 302 are multiple touch sensitive areas 304A and 304B. While the cash dispenser door 302 in this example includes two touch sensitive areas 304A and 304B, the shown number of touch sensitive areas 304 shown is not intended to be limiting and more than two touch sensitive areas 304 may be used. In addition to the techniques as described above with regards to a single touch sensitive area, multiple touch sensitive areas 304A and 304B help allow for further verification that the user has access to the cash dispenser door 302 using a touch pattern. The touch pattern may be indicated to the user via the user interface to instruct the user as to which touch sensitive areas to touch and/or an order in which to touch those areas. For example, the user may be instructed to touch one of the touch sensitive areas, such as touch sensitive area 304B, but not the other touch sensitive area 304A. Alternatively, the user could be instructed to touch both the touch sensitive areas 304A and 304B in a certain order or simultaneously. For example, for an ATM with a cash dispenser slot without a cash dispenser door 302, a touch sensitive area 304A may be placed immediately above the cash dispenser slot and another touch sensitive area 304B may be placed immediately below the cash dispenser slot. The user may then be instructed to touch both touch sensitive areas 304A and 304B to verify that the cash dispenser slot is accessible from both above and below. Similarly, if the ATM includes a shield above or below the cash dispenser slot, a touch sensitive area may be positioned on the shield and another touch sensitive area may be positioned across the shield on the other side of the touch dispenser slot. In certain cases, the touch sensitive areas 304A and 304B may be color coded, differently textured, selectively lit, etc. to help distinguish the touch sensitive areas 304A and 304B either from each other, from the surrounding areas, and/or to indicate the touch pattern.

The touch sensitive areas of FIG. 2 and FIG. 3 may be implemented via different types of touch sensors, including, but not limited to through metal capacitive touch, capacitive touch, resistive touch, infrared, or surface acoustic wave sensors. Where multiple touch sensors are used, different types of touch sensors may be used. For example, where a cash dispenser slot includes a touch sensitive area above and below the cash dispenser slot, the touch sensitive area above the cash dispenser slot may utilize a metal capacitive touch sensor and the touch sensitive area below the cash dispenser slot may utilize a surface acoustic wave sensor.

Figure 4:
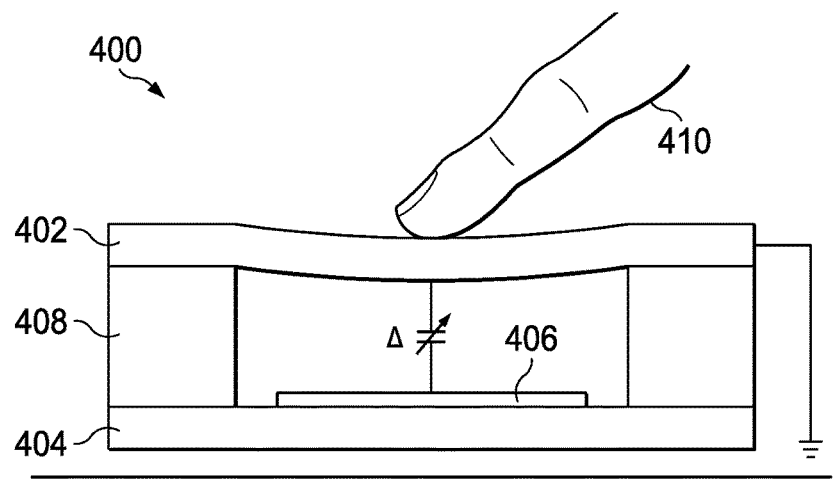
FIG. 4 is a diagram of a through metal capacitive touch sensor, in accordance with aspects of the present disclosure.

In certain cases, a through metal capacitive touch sensor may be used. FIG. 4 is a diagram of a through metal capacitive touch sensor 400, in accordance with aspects of the present disclosure. The sensor 400 includes a conductive metal plate 402 having a first planar surface for receiving a touch and an opposing planar surface on an opposite side, a circuit board 404, a sensor pad 406 on a first surface of the circuit board 404. A spacer 408 keeps the opposing surface of the metal plate 402 at a predetermined distance from a circuit board 404. The circuit board 404 carries sensors 406 on a first surface. The sensors may be of copper, and may be a copper foil or copper electroplated layer that is patterned. For example, the area of sensor 406 may be larger than the end of a human finger. The opening in spacer 408 can enable an amount of deflection in the metal plate. In certain cases, this metal plate 402 may be the surface of, or flush with the surface of the cash dispenser door or other surface onto which the touch sensor is mounted.

The metal plate 402 is of a thickness that allows a deflection due to a human touch. When the pressure of a human finger 410 is applied to the metal plate 402, the metal plate 402 deflects and a change in capacitance proportional to the change in the distance "d" can be detected. By application of a sensing voltage to the bottom plate of the capacitor, which is the sensor 406, a capacitance value can be obtained. By repeatedly scanning a plurality of sensors, a system can detect changes in capacitance and thereby detect a touch. The sensor 406 detects deflections in the metal plate 402 caused by a finger or stylus moving the metal plate 402 towards the sensor 406. The capacitive sensors 406 therefore form deflection sensors.

Figure 5:
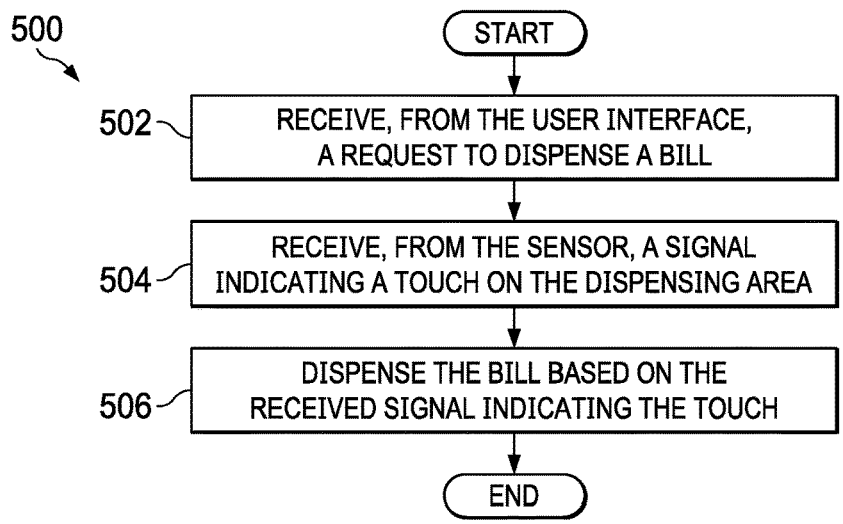
FIG. 5 is a flow diagram illustrating a technique to deter theft from ATMs, in accordance with aspects of the present disclosure.

FIG. 5 is a flow diagram 500 illustrating a technique to deter theft from ATMs, in accordance with aspects of the present disclosure. At block 502, the ATM receives, from the user interface, a request to dispense a bill. For example, after an ATM card is detected and a corresponding PIN is received, a user may request to withdraw cash from the ATM. At block 504, the ATM receives, from a sensor, a signal indicating a touch on the sensor in the dispensing area. For example, the ATM may request that the user touch a touch sensitive area located in a dispensing area, such as next to the cash dispenser slot or on a cash dispenser door. In certain cases, the touch sensitive area may not be in a user accessible location, such as on the cash dispenser door in an area that is normally not exposed to the user. The ATM may first adjust the position of the touch sensitive area, such as by rotating the cash dispenser door to expose the touch sensitive area. At block 506, the ATM dispenses the bill based on the received signal indicating the touch. For example, after receiving a signal indicating the user has touched the touch sensitive area and thus has access to the dispensing area, the ATM dispenses the requested cash.

Figure 6:
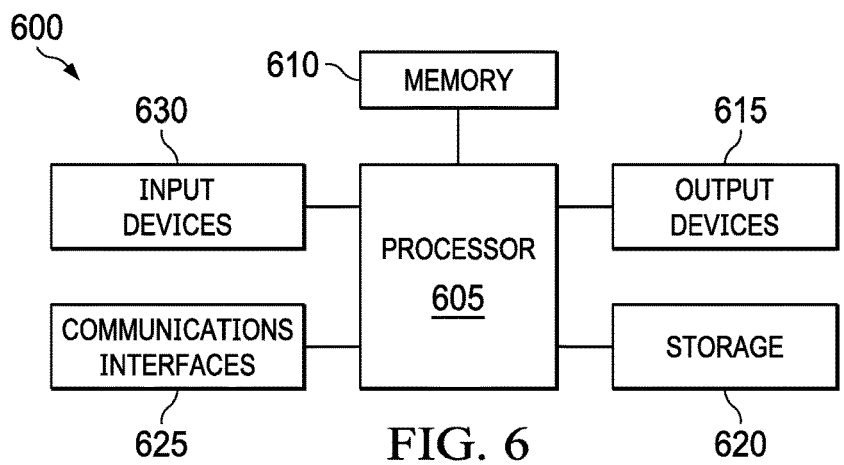
FIG. 6 is a schematic diagram of an embodiment of an ATM, where embodiments of the present disclosure may operate herein.

FIG. 6 is a schematic diagram of an embodiment of a ATM system 600, where embodiments of the present disclosure may operate herein. As illustrated in FIG. 6, ATM system 600 includes a processing element such as processor 605 that contains one or more hardware processors, where each hardware processor may have a single or multiple processor cores. Examples of processors include, but are not limited to a central processing unit (CPU) or a microprocessor. Although not illustrated in FIG. 6, the processing elements that make up processor 605 may also include one or more other types of hardware processing components, such as graphics processing units (GPUs), application specific integrated circuits (ASICs), field-programmable gate arrays (FPGAs), and/or digital signal processors (DSPs).

FIG. 6 illustrates that memory 610 may be operatively and communicatively coupled to processor 605. Memory 610 may be a non-transitory computer readable storage medium configured to store various types of data. For example, memory 610 may include one or more volatile devices such as random-access memory (RAM). Non-volatile storage devices 620 can include one or more disk drives, optical drives, solid-state drives (SSDs), tap drives, flash memory, read only memory (ROM), and/or any other type memory designed to maintain data for a duration time after a power loss or shut down operation. The non-volatile storage devices 620 may also be used to store programs that are loaded into the RAM when such programs executed.

Software programs may be developed, encoded, and compiled in a variety of computing languages for a variety of software platforms and/or operating systems and subsequently loaded and executed by processor 605. In one embodiment, the compiling process of the software program may transform program code written in a programming language to another computer language such that the processor 605 is able to execute the programming code. For example, the compiling process of the software program may generate an executable program that provides encoded instructions (e.g., machine code instructions) for processor 605 to accomplish specific, non-generic, particular computing functions. As an example, the software program may include code for operating components specific to an ATM, such as card readers, cash dispenser doors, deposit slots, specific sensors, integration between those sensors and hardware, etc.

After the compiling process, the encoded instructions may then be loaded as computer executable instructions or process steps to processor 605 from storage 620, from memory 610, and/or embedded within processor 605 (e.g., via a cache or on-board ROM). Processor 605 may be configured to execute the stored instructions or process steps in order to perform instructions or process steps to transform the computing device into a non-generic, particular, specially programmed machine or apparatus. Stored data, e.g., data stored by a storage device 620, may be accessed by processor 605 during the execution of computer executable instructions or process steps to instruct one or more components within the ATM system 600. Storage 620 may be partitioned or split into multiple sections, that may be accessed by different software programs. For example, storage 620 may include a section designated for specific purposes, such as storing program instructions or data for updating software of the ATM system 600. In one embodiment, the software to be updated includes the ROM, or firmware, of the computing device. In certain cases, the ATM system 600 may include multiple operating systems. For example, the ATM system 600 may include a general-purpose operating system which is utilized for normal operations. The ATM system 600 may also include another operating system, such as a bootloader, for performing specific tasks, such as upgrading and recovering the general-purpose operating system, and allowing access to the ATM system 600 at a level generally not available through the general-purpose operating system. Both the general-purpose operating system and the another operating system may have access to the section of storage 620 designated for specific purposes.

A user interface (e.g., output devices 615 and input devices 630) can include a display, positional input device (such as a mouse, touchpad, touchscreen, or the like), keyboard, or other forms of user input and output devices. The input devices 630 may also include devices which do not accept user input directly, but inform the ATM system 600 as to certain conditions, such as light, tilt, direction, and other such sensors. The user interface components may be communicatively coupled to processor 605. When the output device is or includes a display, the display can be implemented in various ways, including by a liquid crystal display (LCD) or a cathode-ray tube (CRT) or light emitting diode (LED) display, such as an organic LED (OLED) display. Persons of ordinary skill in the art are aware that the ATM system 600 may comprise other components well known in the art, such as powers sources, and/or analog-to-digital converters, not explicitly shown in FIG. 6.

In this description, the term "couple" or "couples" means either an indirect or direct wired or wireless connection. Thus, if a first device couples to a second device, that connection may be through a direct connection or through an indirect connection via other devices and connections. The recitation "based on" means "based at least in part on." Therefore, if X is based on Y, X may be a function of Y and any number of other factors.

Modifications are possible in the described embodiments, and other embodiments are possible, within the scope of the claims.

What is claimed is:

1. An electronic device, comprising:
one or more processors;
a user interface in a user interface area;
a bill dispensing mechanism in a bill dispensing area, the bill dispensing area having a sensor, the bill dispensing area separate from the user interface area; and
a non-transitory program storage device comprising instructions stored thereon to cause the one or more processors to:
receive, from the user interface, a request to dispense a bill;
receive, from the sensor, a signal indicating a touch on the sensor in the bill dispensing area; and
dispense the bill based on the received signal indicating the touch.

2. The electronic device of claim 1, wherein the dispensing area includes a dispensing door.

3. The electronic device of claim 2, wherein the dispensing door includes a metal external surface and wherein the sensor is configured to detect touches through the metal external surface.

4. The electronic device of claim 2, wherein the dispensing door includes a touch sensitive area corresponding to the sensor and wherein the touch sensitive area is located in a user inaccessible location.

5. The electronic device of claim 4, wherein the stored instructions further comprise instructions to cause the one or more processors to adjust, in response to the received request to dispense the bill, the dispensing door so that the touch sensitive area of the dispensing door is user accessible.

6. The electronic device of claim 1,
wherein the sensor is a first sensor, the touch is a first touch, and the signal is a first signal;
wherein the bill dispensing mechanism includes a second sensor, the second sensor configured to indicate touches on a different part of the dispensing area as the first sensor, and wherein the stored instructions further comprise instructions to cause the one or more processors:
receive, from the second sensor, a second signal indicating a second touch on the second sensor in the dispensing area, and
wherein dispensing the bill is based on the received first signal and the received second signal.

7. The electronic device of claim 6, wherein the stored instructions further comprise instructions to cause the one or more processors to:
indicate, via the user interface, a touch pattern showing which touch sensitive areas to touch, the touch sensitive areas comprising a first touch sensitive area corresponding to the first sensor, and a second touch sensitive area corresponding to the second sensor.

8. The electronic device of claim 1, wherein the sensor comprises one of a metal capacitive touch, capacitive touch, resistive touch, infrared, or surface acoustic wave sensor.

9. The electronic device of claim 1, wherein the dispensing area includes a dispensing slot without a user accessible dispensing door, and wherein the sensor is within two inches of the dispensing slot.

10. A system, comprising:
one or more processors;
a user interface in a user interface area;

a bill dispensing mechanism in a bill dispensing area, the bill dispensing area having a first sensor, the bill dispensing area separate from the user interface area; and a non-transitory program storage device comprising instructions stored thereon to cause the one or more processors to:

receive, from the user interface, a request to dispense a bill;

receive, from the first sensor, a first signal indicating a first touch on the first sensor in the bill dispensing area; and dispense the bill based on the received first signal indicating the first touch.

11. The system of claim 10, wherein the dispensing area includes a dispensing door.

12. The system of claim 11, wherein the dispensing door includes a metal external surface and wherein the sensor is configured to detect touches through the metal external surface.

13. The system of claim 11, wherein the dispensing door includes a touch sensitive area corresponding to the sensor and wherein the touch sensitive area is located in a user inaccessible location.

14. The system of claim 13, wherein the stored instructions further comprise instructions to cause the one or more processors to adjust, in response to the received request to dispense the bill, the dispensing door so that the touch sensitive area of the dispensing door is user accessible.

15. The system of claim 10,
wherein the sensor is a first sensor, the touch is a first touch, and the signal is a first signal;
wherein the bill dispensing mechanism includes a second sensor, the second sensor configured to indicate touches on a different part of the dispensing area as the first sensor, and further comprising:
receiving, from the second sensor, a second signal indicating a second touch on the second sensor in the dispensing area, and
wherein dispensing the bill is based on the received first signal and the received second signal.

16. The system of claim 15, wherein the stored instructions further comprise instructions to cause the one or more processors:
indicate, via the user interface, a touch pattern showing which touch sensitive areas to touch, the touch sensitive areas comprising a first touch sensitive area corresponding to the first sensor, and a second touch sensitive area corresponding to the second sensor.

17. The system of claim 10, wherein the sensor comprises one of a metal capacitive touch, capacitive touch, resistive touch, infrared, or surface acoustic wave sensor.

18. The system of claim 10, wherein the dispensing area includes a dispensing slot without a user accessible dispensing door, and wherein the sensor is within two inches of the dispensing slot.

19. A method, the method comprising:
receiving, from a user interface in a user interface area, a request to dispense a bill;
receiving, from a sensor disposed in a dispensing area, a signal indicating a touch on the sensor in the dispensing area, the dispensing area separate from the user interface area; and
dispensing the bill based on the received signal indicating the touch.

20. The method of claim 19, wherein the dispensing area includes a dispensing door, wherein the dispensing door includes a touch sensitive area corresponding to the sensor and wherein the touch sensitive area is located in a user inaccessible location, and the method further comprising:
adjusting, in response to the received request to dispense the bill, the dispensing door so that the touch sensitive area of the dispensing door is user accessible.

21. The method of claim 20,
wherein the sensor is a first sensor, the touch is a first touch, and the signal is a first signal;
wherein the bill dispensing mechanism includes a second sensor, the second sensor configured to indicate touches on a different part of the dispensing area as the first sensor, and the method further comprising:
receiving, from the second sensor, a second signal indicating a second touch on the second sensor in the dispensing area, and
wherein dispensing the bill is based on the received first signal and the received second signal.

22. The method of claim 21, the method further comprising:
indicating, via the user interface, a touch pattern showing which touch sensitive areas to touch, the touch sensitive areas comprising a first touch sensitive area corresponding to the first sensor, and a second touch sensitive area corresponding to the second sensor.

* * * * *